United States Patent [19]

Mitoff

[11] 4,132,820
[45] Jan. 2, 1979

[54] COMPOSITE BODY WITH BETA-ALUMINA SUBSTRATE AND GLASS-COATING THEREON

[75] Inventor: Stephan P. Mitoff, Clifton Park, N.Y.

[73] Assignee: General Electric Company, Schenectady, N.Y.

[21] Appl. No.: 804,941

[22] Filed: Jun. 9, 1977

[51] Int. Cl.² .................. B32B 3/24; B32B 17/06
[52] U.S. Cl. ................... 428/65; 428/137; 428/432; 428/433; 429/185
[58] Field of Search ............... 428/64, 65, 131, 137, 428/432, 433; 65/43, 59 R; 136/6 FS, 6 F, 6 R, 83 R, 100 R, 166, 169, 170; 206/2; 220/62, 68; 429/185

[56] References Cited

U.S. PATENT DOCUMENTS

| 3,281,309 | 10/1966 | Ross | 428/433 |
| 3,826,629 | 7/1974 | Pryor et al. | 428/432 |
| 3,960,596 | 6/1976 | Mitoff et al. | 136/6 FS |

OTHER PUBLICATIONS

"Technical Glasses", M. B. Volf, 1961, Sir Isaac Pitman and Sons Ltd. London, England, pp. 399-400.
"The Influence of Chemical Properties of Glazes", by F. P. Hall, Journal of the American Ceramic Society, vol. 13, 1930, pp. 182-199.

Primary Examiner—Stanley S. Silverman
Attorney, Agent, or Firm—Paul R. Webb, II; Joseph T. Cohen; Leo I. MaLossi

[57] ABSTRACT

A composite body has a beta-alumina substrate with at least one aperture therethrough, and a glass coating covering and adhering to the entire external surface of the substrate. The glass coating has sodium resistance, low alkali ion-conductance, and a coefficient of thermal expansion of 7.3 to 6.1 × $10^{-6}$ inches/inch/° C.

5 Claims, 4 Drawing Figures

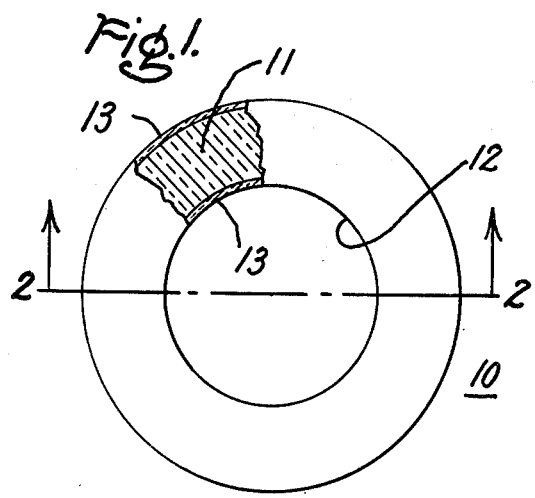
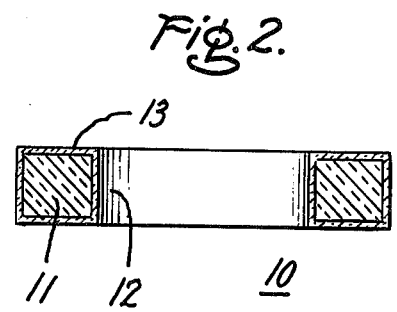
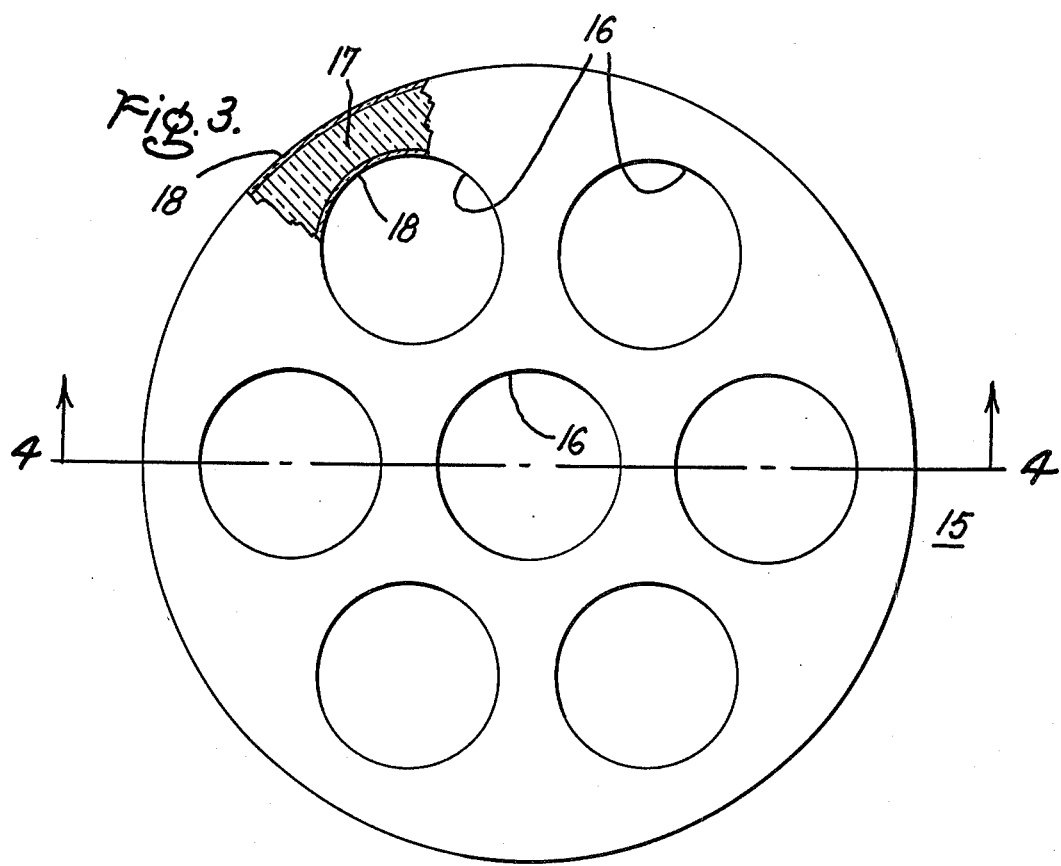
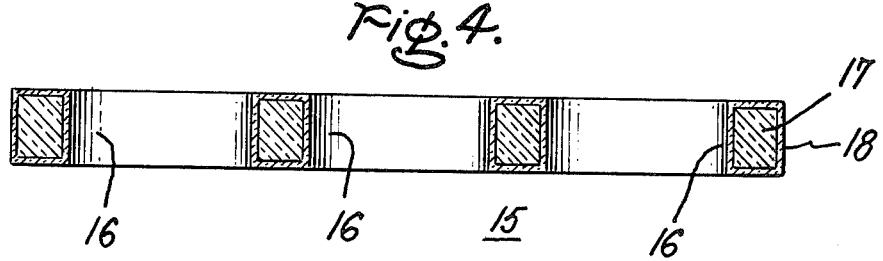

COMPOSITE BODY WITH BETA-ALUMINA SUBSTRATE AND GLASS-COATING THEREON

This invention relates generally to a composite body and, more particularly to a composite body with a beta-alumina substrate and a specific glass coating thereon.

Such composite bodies are useful as seal flanges for solid electrolyte tubes in sodium-sulfur batteries. Such a sodium-sulfur battery employing a seal flange is described in U.S. Pat. No. 3,960,596 — Mitoff et al., entitled "Battery Casing and Hermetically Sealed Sodium-Sulfur Battery." This patent is assigned to the same assignee as the present application.

The term beta-alumina as used in the present invention includes beta-alumina, beta"-alumina, mixtures thereof, and related compounds.

In U.S. Pat. No. 3,281,309 — Ross, entitled "Ceramic Bonding", there is described a method of bonding a high density polycrystalline alumina ceramic member to another high density polycrystalline alumina ceramic which comprises the steps of applying to the surfaces to be bonded together a suspension of sealing glass powder comprising principally aluminum oxide and an alkaline earth metal oxide in proportions having a melting temperature lower than the melting point of either of the members, holding the members together and heating the members to a temperature sufficient to liquefy the sealing glass powder but lower than the melting point of either of the members.

In the above-mentioned U.S. Pat. No. 3,960,596 — Mitoff et al., a battery casing and a hermetically sealed sodium-sulfur battery are formed with an electrically insulating ceramic ring of, for example, alpha-alumina. An inner casing of a solid sodium ion-conductive material of sodium beta-alumina material with one open end has a portion of its outer wall adjacent its open end sealed within and to the alpha-alumina ring with a glass seal. A pair of outer metallic casings with opposite open ends are sealed to the opposite surfaces of the alpha-alumina ring by respective glass seals. Removable metallic closed ends are provided for the remaining open ends of the outer metallic casings. For each of the above glass seals, glass is provided in the form of a washer which is positioned between adjacent parts to be sealed. Subsequently, the associated components with the glass washer therebetween are heated whereby the glass seals together the associated components. The glass washers are described as made of suitable sodium and sulfur resistant glass, such as Corning glass No. 7052, General Electric Company glass No. 1013, Sovirel glass No. 747 or Kimble glass No. N-51A.

My invention is directed to a composite body with a beta-alumina substrate, and a sodium resistant, low alkali ion-conductance glass coating thereon which has a coefficient of thermal expansion close to the coefficient of thermal expansion of beta-alumina.

The primary object of my invention is to provide an improved composite body which is useful as a seal flange for a solid electrolyte tube in a sodium-sulfur battery.

In accordance with one aspect of my invention, a composite body has a beta-alumina substrate with at least one aperture therethrough, and a sodium resistant, low alkali ion-conductance glass coating covering and adhering to the entire external surface of the substrate, the glass coating having a coefficient of thermal expansion of 7.3 to 6.1 × $10^{-6}$ inches/inch/° C.

These and various other objects, features, and advantages of the invention will be better understood from the following description taken in connection with the drawing.

FIG. 1 is a top plan view partially in section of a composite body made in accordance with my invention;

FIG. 2 is a sectional view of the composite body shown in FIG. 1 taken on line 2—2 thereof;

FIG. 3 is a top plan view of a modified composite body made in accordance with my invention; and FIG. 4 is a sectional view of the modified composite body shown in FIG. 3 taken on line 4—4 thereof.

In FIG. 1 of the drawing, there is shown generally at 10 a composite body embodying my invention. Composite body 10 which is shown in the form of a ring, comprises a substrate 11 of beta-alumina such as sodium beta-alumina. Composite body 10 has an aperture 12 therethrough. A sodium resistant, low alkali ion-conductance glass coating 13 covers and adheres to the entire external surface of substrate 11. The glass coating has a coefficient of thermal expansion of 7.3 to 6.1 × $10^{-6}$ inches/inch/° C. which is close to the coefficient of thermal expansion of beta-alumina.

In FIG. 2 of the drawing, there is shown a sectional view of composite body 10 as illustrated in FIG. 1 of the drawing and taken on line 2—2 thereof. Beta-alumina substrate 11 is shown with its external surface completely covered by glass coating 13 which adheres thereto. Aperture 12 is shown extending through composite body 10.

In FIG. 3 of the drawing, there is shown a modified composite body 15 having a plurality of apertures 16 therethrough. Composite body 15 has a beta-alumina substrate 17 such as sodium beta-alumina. A plurality of apertures 16 extend through composite body 15. A sodium resistant, low alkali ion-conductance glass coating 18 covers and adheres to the entire external surface of substrate 17. The glass coating has a coefficient of thermal expansion of 7.3 to 6.1 × $10^{-6}$ inches/inch/° C.

In FIG. 4 of the drawing, there is shown a sectional view of composite body 15 illustrated in FIG. 3 of the drawing taken on line 4—4 thereof.

It would be advantageous to improve the glass seal between the flange and the beta-alumina tube in a sodium-sulfur battery thereby increasing the life of the cell. The sodium metal attacks the glass seal between the flange and the tube which can result in disintegration of the seal and subsequent failure of the cell. The seal glass reacts also adversely with the beta-alumina tube material contributing to the destruction of the glass seal. It would also be desirable to minimize the thermal expansion strains at the glass seal area.

From a thermal stress standpoint, beta-alumina material for the flange would appear ideal. However, this flange must be sealed to both the beta-alumina tube and to two opposed outer metal casings. The glass seal would be subject to potential attack by sodium metal. A more serious problem in its selection is that beta-alumina is ion-conductive as opposed to alpha-alumina which is ion-insulating. The use of an ion-insulating glass seal might be employed between the beta-alumina flange and the outer metallic casings to overcome this problem. However, a further problem is presented in that the exposed areas of metal casing contact to the beta-alumina flange would act as shorted sodium/air cells forming $Na_2O$ and $NaOH$ at the junction, which would eventually destroy the seals.

I found that I could form a composite body, for example, a seal flange, from a beta-alumina substrate. The substrate has a sodium resistant, low alkali ion-conductance glass coating covering and adhering to the external surface of the substrate. The glass coating has a coefficient of thermal expansion of 7.3 to 6.1 × 10$^{-6}$ inches/inch/° C. At least one aperture extends through the composite body. Thus, from one to a plurality of apertures in the composite body are useful. The glass coating covers and adheres to the substrate wall of each aperture since such wall is part of the external surface of the substrate.

I found that glass coating for the beta-alumina substrate of my composite body can be selected from glasses having the following composition ranges:

| Component | Weight Percent |
|---|---|
| SiO$_2$ | 0 – 35 |
| B$_2$O$_3$ | 10 – 60 |
| Al$_2$O$_3$ | 10 – 30 |
| BaO | 10 – 40 |
| CaO | 2 – 15 |
| MgO | 0 – 10 |
| Na$_2$O | 4 – 14 |
| K$_2$O | 0 – 2 |
| P$_2$O$_5$ | 0 – 20 |

The above glass compositions are set forth on pages 399–400 in "Technical Glasses" by M. B. Volf published in 1961 by Sir Isaac Pitman and Sons, Ltd., London, England. The above glass composition provide sodium resistance and low alkali ion-conductance which are required in the glass coating of my composite body. The third requirement is that the glass coating have a coefficient of thermal expansion close to that of beta-alumina. Such a coefficient of thermal expansion is 7.3 to 6.1 × 10$^{-6}$ inches/inch/° C.

Various glass compositions can be selected from the above glass composition ranges provided that the coefficient of thermal expansion is 7.3 to 6.1 × 10$^{-6}$ inches/inch/° C. The glass composition required to provide the above range of the coefficient of thermal expansion is calculated as described in the article entitled "The Influence of Chemical Properties of Glazes" by F. P. Hall in the "Journal of the American Ceramic Society", Volume 13, 1930, pages 182–199.

Three additional specific glass coatings for the substrate of my composite body are (1) 10 weight percent SiO$_2$, 27 weight percent Al$_2$O$_3$, 10 weight percent CaO, 41.5 weight percent B$_2$O$_3$, 6 weight percent Na$_2$O, 0.5 weight percent K$_2$O and 5 weight percent BaO; (2) 50 weight percent SiO$_2$, 10 weight percent B$_2$O$_3$, 10 weight percent Al$_2$O$_3$, and 30 weight percent BaO; and (3) 17 weight percent SiO$_2$, 43 weight percent B$_2$O$_3$, 10 weight percent Al$_2$O$_3$, 28 weight percent BaO, and 2 weight percent Na$_2$O. The first glass coating is set forth on page 399 of the above referenced "Technical Glasses." The second glass coating is General Electric Company glass No. 1013. The third glass coating is my preferred composition.

I found also that a glass coating for the beta-alumina substrate of my composite body can be selected from glasses having the following composition ranges:

| Component | Weight Percent |
|---|---|
| Al$_2$O$_3$ | 42 – 55 |
| MgO | 0 – 10 |
| CaO | 30 – 50 |
| BaO | 0 – 20 |

I found that my composite body was advantageous as a seal flange for a beta-alumina tube in a sodium-sulfur battery. The desirable property of the flange for matching the thermal expansion of the tube eliminates the thermal stress problem of the seal between the tube and the flange. The glass coating, which is sodium resistant and has low alkali ion-conductance, made possible the use of a beta-alumina flange substrate, and eliminated attack by the sodium metal. The glass coating provides the seal between the tube and flange, and between the flange and outer metallic casings.

The composite body with a single aperture therethrough can be employed with a single open ended tube of a solid ion-conductive material, such as, sodium beta-alumina to form the flange for the tube. A portion of the outer wall of the tube adjacent its open end is sealed within and to the aperture wall of the composite body. The glass coating on the wall of the composite body aperture provides the glass seal. Similarly, the composite body with a plurality of apertures therethrough can be employed with a plurality of open ended tubes of solid ion-conductive material, such as, sodium beta-alumina to form the flange for the tubes. A portion of the outer wall of each tube adjacent its open end is sealed within and to one of the aperture walls of the composite body.

My composite body is formed from a disc of beta-alumina, such as sodium beta-alumina, which will form the substrate for the body. A hole is drilled through the beta-alumina disc thereby providing the substrate with a single aperture therethrough. A sodium resistant, low alkali ion-conductance glass coating with a coefficient of thermal expansion of 7.3 to 6.1 × 10$^{-6}$ inches/inch/° C. is formed from a glass sealing mixture, for example, in the form of a slurry in which the oxide powders are mixed with a liquid such as a mixture of alcohol and a suitable binder. The slurry is provided to the entire external surface of the substrate including the wall of the aperture. The substrate coated with the slurry is then heated to a temperature of 800° C. to 1500° C. in an air atmosphere, thereby adhering the coating to the substrate. The resulting device is a composite body made in accordance with my invention.

A composite body is formed from a beta-alumina disc, such as sodium beta-alumina. A plurality of holes are drilled through the disc thereby providing a beta-alumina substrate with a plurality of apertures therethrough. A glass coating mixture is formed into a slurry as described above and applied to the entire external surface of the substrate including the walls of the apertures. After the substrate, with the slurry thereon, is heated from 800° C. to 1500° C. in an air atmosphere, the glass coating adheres firmly to the entire external surface of the substrate. This device is a composite body made in accordance with my invention.

A beta-alumina tube can be sealed within and to the wall of the single aperture in the composite body by positioning a portion of the outer wall of the tube adjacent its open end within the aperture of the composite body. The glass coating can then be reheated in a temperature from 800° C. to 1500° C. in an air atmosphere to initially soften the glass and subsequently seal the tube to the composite body. This same procedure can be employed with a composite body having a plurality of apertures therethrough. It will also be appreciated that the beta-alumina tube can be positioned within the aperture of the composite body after the glass coating mixture has been applied as a slurry to the beta-alumina substrate. This assembly can then be heated in a temperature of 800° C. to 1500° C. in an air atmosphere to provide the glass coating completely over the external surface of the beta-alumina substrate and to seal a portion of the beta-alumina tube within the aperture of the composite body. In a similar manner a plurality of beta-alumina tubes can be sealed within a plurality of openings in a composite body.

Examples of composite bodies made in accordance with my invention are set forth below.

EXAMPLE I

A composite body was formed by drilling a hole through a disc of sodium beta-alumina thereby providing a beta-alumina substrate with a single aperture therethrough. A glass coating mixture was applied to the entire external surface of the substrate including the wall aperture in the form of a slurry in which the oxide powders of the mixture are mixed with alcohol and a suitable binder. The glass coating mixture comprised 17 weight percent $SiO_2$, 43 weight percent $B_2O_3$, 10 weight percent $Al_2O_3$, 28 weight percent BaO, and 2 weight percent $Na_2O$. The substrate coated with the glass coating mixture was heated at a temperature of 850° C. in an air atmosphere thereby resulting in a composite body made in accordance with my invention.

EXAMPLE II

A composite body is formed by drilling a plurality of holes through a disc of sodium beta-alumina thereby providing a beta-alumina substrate with a plurality of apertures therethrough. A glass coating mixture is applied to the entire external surface of the substrate including the wall apertures in the form of a slurry in which the oxide powders of the mixture are mixed with alcohol and a suitable binder. The glass coating mixture comprises 17 weight percent $SiO_2$, 43 weight percent $B_2O_3$, 10 weight percent $Al_2O_3$, 28 weight percent BaO, and 2 weight percent $Na_2O$. The substrate coated with the glass coating mixture is heated at a temperature of 850° C. in an air atmosphere thereby resulting in a composite body made in accordance with my invention.

While other modifications of the invention and variations thereof which may be employed within the scope of the invention have not been described, the invention is intended to include such as may be embraced within the following claims.

What I claim as new and desire to secure by Letters Patent of the United States is:

1. A composite body comprising a sodium beta-alumina substrate having at least one aperture therethrough, and a sodium resistant, low alkali ion-conductance glass coating covering and adhering to the entire external surface of the substrate, the glass coating having a coefficient of thermal expansion of 7.3 to 6.1 × $10^{-6}$ inches/inch/° C.

2. A composite body as in claim 1, in which the glass coating comprises 17 weight percent $SiO_2$, 43 weight percent $B_2O_3$, 10 weight percent $Al_2O_3$, 28 weight percent BaO, and 2 weight percent $Na_2O$.

3. A composite body as in claim 1, in which the substrate is in the form of a ring with a single aperture therethrough.

4. A composite body as in claim 1, in which the substrate has a plurality of apertures therethrough.

5. A composite body as in claim 1, in which the substrate is in the form of a ring with a plurality of apertures therethrough.

* * * * *